United States Patent
Slater et al.

(10) Patent No.: US 11,299,386 B2
(45) Date of Patent: *Apr. 12, 2022

(54) SOAP, SANITIZER AND LOTION REFILL UNITS MANAGEMENT AND TRACKING

(71) Applicant: GOJO Industries, Inc., Akron, OH (US)

(72) Inventors: Jason M. Slater, Barberton, OH (US); Mark A. Bullock, Wooster, OH (US); Tamara M. Cross, Uniontown, OH (US); John Lerner, Hudson, OH (US); April Bertram, Canton, OH (US); Bradley L. Lightner, North Canton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/183,697

(22) Filed: Feb. 24, 2021

(65) Prior Publication Data
US 2021/0179416 A1 Jun. 17, 2021

Related U.S. Application Data

(63) Continuation of application No. 16/736,948, filed on Jan. 8, 2020, now Pat. No. 10,934,153, which is a continuation of application No. 16/001,311, filed on Jun. 6, 2018, now Pat. No. 10,532,920.

(60) Provisional application No. 62/518,298, filed on Jun. 12, 2017.

(51) Int. Cl.
*B67D 3/00* (2006.01)
*G06Q 10/06* (2012.01)
*G06Q 10/08* (2012.01)
*A47K 5/12* (2006.01)

(52) U.S. Cl.
CPC .......... *B67D 3/0074* (2013.01); *G06Q 10/06* (2013.01); *G06Q 10/087* (2013.01); *A47K 5/1217* (2013.01)

(58) Field of Classification Search
CPC .... B67D 3/0074; A47K 5/1217; G06Q 10/06; G06Q 10/087
USPC .......................... 222/29, 59, 65, 66, 132, 135
See application file for complete search history.

(56) References Cited

U.S. PATENT DOCUMENTS

| | | | |
|---|---|---|---|
| 5,299,713 A | 4/1994 | Saitoh | |
| 7,783,380 B2 | 8/2010 | York et al. | |
| 8,201,707 B2 | 6/2012 | Ophardt | |
| 8,479,951 B2 | 7/2013 | Ciavarella et al. | |
| 9,172,266 B2 | 10/2015 | Curtis et al. | |
| 10,532,920 B2 | 1/2020 | Slater et al. | |
| 10,934,153 B2 | 3/2021 | Slater et al. | |
| 2012/0245729 A1 | 9/2012 | Wegelin et al. | |
| 2013/0098941 A1 | 4/2013 | Wegelin | |
| 2013/0168411 A1 | 7/2013 | Beavis et al. | |
| 2015/0223646 A1 | 8/2015 | Wegelin et al. | |

*Primary Examiner* — Vishal Pancholi
(74) *Attorney, Agent, or Firm* — Calfee, Halter & Griswold, LLP

(57) ABSTRACT

An exemplary methodology for managing soap, sanitizer and lotion refills includes associating a first refill unit with a first dispenser, determining one or more usage rates for the first dispenser, determining an expected depletion date for the first refill unit. The methodology further includes associating a second refill unit with a second dispenser, determining one or more usage rates for the second dispenser, and determining an expected depletion date for the second refill unit. The methodology further includes providing instructions to move the first refill unit to the second dispenser and the second refill unit to the first dispenser.

20 Claims, 10 Drawing Sheets

SOAP, SANITIZER AND LOTION REFILL UNITS MANAGEMENT AND TRACKING

RELATED APPLICATIONS

This application claims priority to and the benefits of U.S. application Ser. No. 16/736,948 that was filed on Jan. 8, 2020 and is titled SOAP, SANITIZER AND LOTION REFILL UNITS MANAGEMENT AND TRACKING, which claims priority to and the benefits of U.S. application Ser. No. 16/001,311 that was filed on Jun. 6, 2018 and is titled SOAP, SANITIZER AND LOTION REFILL UNITS MANAGEMENT AND TRACKING and, which claims priority to and the benefits of U.S. Provisional Application Ser. No. 62/518,298 that was filed on Jun. 12, 2017 and is titled SOAP, SANITIZER AND LOTION REFILL UNITS MANAGEMENT AND TRACKING. Each of which are incorporated by reference herein in their entirety.

BACKGROUND

Fluid dispensers are commonly used in restaurants, factories, hospitals, and public bathrooms. These dispensers contain fluids such as, for example, soap, sanitizers, lotions, anti-bacterial cleansers, disinfectants, and the like. Some dispensers utilize a manual pump actuation mechanism wherein a user pushes or pulls a lever to manually dispense a quantity of fluid into the user's hands. "Hands-free" dispensers may also be utilized wherein the user simply places their hand underneath or in front of a sensor and an electromechanical pump mechanism dispenses a metered quantity of fluid.

In some applications, a dispenser receives a replaceable refill having a cartridge or container (e.g., a bag, pouch, or tank) that is installed within the dispenser housing or attached to the dispenser (e.g., below a countertop) and is connected to a pump mechanism and an outlet port for dispensing the contents of the container. When the fluid in the container is depleted, the container is detached from the pump mechanism and a new, filled container is installed and attached to the pump mechanism. In some embodiments, the container includes a pump.

In some applications, dispensers are "high use" dispensers and in some applications, dispensers are "low use" or "medium use" dispensers. The designation of "high", "medium" or "low" use indicates the throughput/volume of material dispensed by the dispensers, not necessarily that the dispensers differ from one another.

The products contained in the refill unit often have an expiration date. In certain industries if products are found in dispensers after the expiration date, the offenders face written and financial penalties. In addition, discarding refill units because their expiration date often results in wasted product.

SUMMARY

The present application contemplates inventive systems and methods for monitoring and/or controlling dispenser fluid refill operations.

An exemplary methodology for managing soap, sanitizer and lotion refills includes associating a first refill unit with a first dispenser, determining one or more usage rates for the first dispenser, determining an expected depletion date for the first refill unit, which in some embodiments is as a function of the volume of fluid in the first refill unit and the one or more usage rates for the first dispenser. The methodology further includes associating a second refill unit with a second dispenser, determining one or more usage rates for the second dispenser, and determining an expected depletion date for the second refill unit, which in some embodiments is as a function of the volume of fluid in the second refill unit and the one or more usage rates for the second dispenser. The methodology further includes providing instructions to move the first refill unit to the second dispenser and the second refill unit to the first dispenser.

Another exemplary methodology for managing soap, sanitizer and lotion refills includes associating a first refill unit with a first dispenser, determining one or more usage rates for the first dispenser, determining an expected depletion date for the first refill unit, which in some embodiments is as a function of the volume of fluid in the first refill unit and the one or more usage rates for the first dispenser and obtaining an expiration date of the first refill unit. The methodology further includes associating a second refill unit with a second dispenser, determining one or more usage rates for the second dispenser, determining an expected depletion date for the second refill unit, which in some embodiments is as a function of the volume of fluid in the second refill unit and the one or more usage rates for the second dispenser and obtaining an expiration date of the second refill unit. The mythology also includes providing instructions to move the first refill unit to the second dispenser and the second refill unit to another dispenser.

Another exemplary methodology method for managing soap, sanitizer and lotion refills includes associating a refill unit with a first dispenser, obtaining an expiration date for the refill unit, determining whether to provide instructions to move the refill unit to another dispenser; determining whether the refill unit has expired, allowing the dispenser to function if the refill unit has not expired; and disabling the dispenser if the refill unit has expired.

Still yet another exemplary methodology for managing soap, sanitizer and lotion refills includes associating a refill unit with a first dispenser, obtaining an expiration date for the refill unit, determining whether the expiration date is correct, recalculating the expiration date if the date is not correct; and associating the new expiration date with the refill unit.

Another exemplary methodology for managing soap, sanitizer and lotion refills includes determining that a refill unit has been installed a first dispenser, determining whether the refill unit has previously been installed in a second dispenser, determining whether the refill unit has dispensed product in the first dispenser and associating any dispensed product from the refill unit with the first dispenser, determining whether the refill unit has dispensed product in the second dispenser and associating any dispensed product from the refill unit with the second dispenser, and providing a report indicative of the refill unit's history with the first and second dispensers.

Another exemplary methodology for managing soap, sanitizer and lotion refill units includes associating a first refill unit with a first dispenser, determining one or more usage rates for the first dispenser, determining an expected depletion date for the first refill unit, which in some embodiments is as a function of the volume of fluid in the first refill unit and the one or more usage rates for the first dispenser, obtaining an expiration date of the first refill unit and determining whether the first refill unit will be depleted prior to the expiration date. The methodology further includes providing instructions to move the first refill unit to a second dispenser.

An exemplary methodology for managing soap, sanitizer or lotion refill units recalls includes associating a first refill unit with a first dispenser, transmitting a unique identifier for the first refill unit to a master station, determining whether the first refill unit is under a recall notice and providing an alert that the first refill unit is under a recall notice.

BRIEF DESCRIPTION OF THE DRAWINGS

These and other features and advantages of the present invention will become better understood with regard to the following description and accompanying drawings in which.

DETAILED DESCRIPTION

Figure 1:
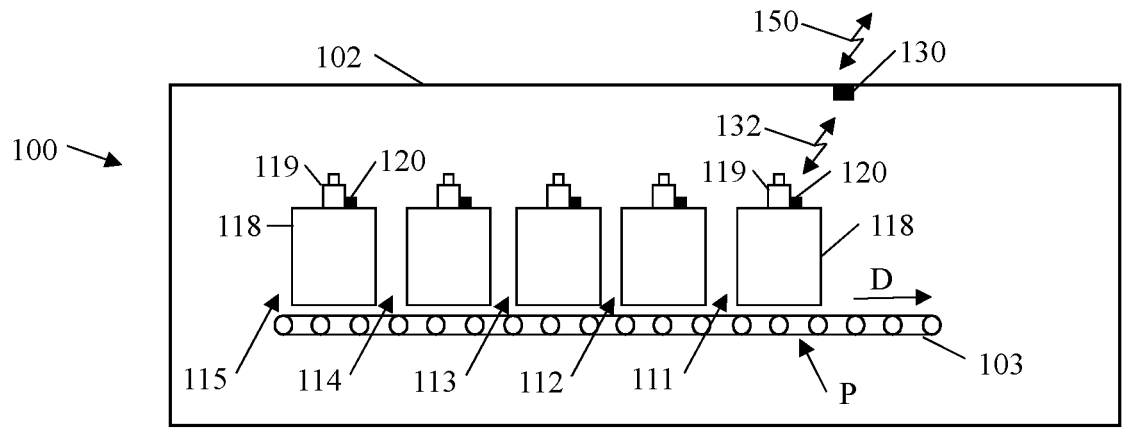
FIG. 1 is a schematic diagram of a portion of an exemplary manufacturing facility.

The Detailed Description merely describes exemplary embodiments of the invention and is not intended to limit the scope of the claims in any way. Indeed, the invention is broader than and unlimited by the exemplary embodiments, and the terms used in the claims have their full ordinary meaning. In addition, the exemplar mythologies may include additional blocks or steps or may have some blocks or steps removed. Further, the blocks or steps may be performed in different orders.

While certain exemplary embodiments described in the specification and illustrated in the drawings relate to refill units for wall mounted fluid dispensers and refill containers for hand hygiene applications, and systems and methods for monitoring and controlling refilling of hand hygiene dispenser devices, many of the inventive features described herein may be applied to other devices, systems, and methods. For example, the features described herein may be utilized in other dispensing arrangements (e.g., internal refill cartridge based dispensers, counter-mount dispensers, stand mounted dispensers, standalone dispensers, tabletop dispensers, portable dispensers) and with other fluids, such as, for example, soaps, lotions, and the like.

"Circuit communication" indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

"Logic," as used herein, is synonymous with "circuit" or "circuitry" and includes, but is not limited to, hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

"Signal," includes, but is not limited to one or more electrical signals, analog or digital signals, one or more computer instructions, a bit or bit stream, or the like.

Any values identified in the detailed description are exemplary and they are determined as needed for a particular dispenser and/or refill design. Accordingly, the inventive concepts disclosed and claimed herein are not limited to the particular values or ranges of values used to describe the embodiments disclosed herein.

FIG. 1 is a schematic diagram of portion of an exemplary manufacturing facility 100. Manufacturing facility 100 includes a building 102 having a processing equipment (not shown), a container filling station (not shown) and a conveyor 103 moving in direction D. Located on conveyor 103 are a plurality of refill units 111, 112, 113, 114, and 115. Each refill unit 111, 112, 113, 114, and 115 includes a pump 119 and wireless communication circuitry 120 having memory. In some embodiments, the refill unit does not include a pump and the refill unit includes a connector that connects to a pump or reservoir located in the dispenser.

The wireless communication circuitry 120 may be any type wireless communication circuitry configured as described herein, such as, for example, a Radio Frequency Identification Device ("RFID"), Bluetooth® communication circuitry, a radio frequency module ("RF transceiver"); an InfraRed transmitter/receiver, a wi-fi router, combinations thereof and the like. Wireless communication circuitry 120 includes memory and may also include a processor for processing data. In some embodiments, wireless communication circuitry 120 is not used, however the refill unit still includes communication circuitry, memory and an optional processor and the data is transmitted via another method, such as, for example, a hardwired connection, or a cable with a connector (not shown), one or more contacts (not shown), or the like.

As the refill units, e.g. refill unit 111, reaches position P, wireless communication circuitry 130 establishes circuit communication with wireless communication circuitry 120. In some embodiments, circuit communications are established with a hard wire connection, such as, for example, an Ethernet cable (not shown), one or more contacts (not shown), or the like.

Wireless communication circuitry 130 is in circuit communication with a database (not shown) via signal 150 that contains one or more pieces of manufacturing data associated with refill 111. The wireless communication circuitry 130 may be any wireless communication circuitry, such as, for example, a Radio Frequency Identification Device ("RFID"), Bluetooth® communication circuitry, a radio frequency module ("RF transceiver"); an InfraRed transmitter/receiver, a wi-fi router, combinations thereof, and the like. In some embodiments, wireless communication circuitry is not used and the data is transmitted via a hardwired connection, or a cable with a connector (not shown).

The manufacturing data stored in the database may include, for example: manufacture date, manufacture time, manufacturing location; lot number; batch number; ingredients; origin of ingredients; formulation; expiration date; operator information; mixing equipment identification; bulk holding tank identification; container size; volume of fluid; container material; pump type; pump size; connection type; distributor information; Material Safety Data Sheets (MSDS) information; country of origin; doses of fluid in the container; and the like. In addition, sustainability information may be stored in the database and may be associated with the refill unit, such as, for example, the material type and identification of which parts are recyclable.

A unique identifier, such as, for example, a serial number is assigned to the refill unit 111 and the unique identifier is communicated to refill unit 111 through wireless communication circuitry 130 via signals(s) 132 and is stored in the memory (not shown) of wireless communication circuitry 120. In some embodiments, some or all the manufacturing data is stored in the memory (not shown) of wireless communication circuitry 120. In some embodiments, the manufacturing data is stored in a database and is associated with the serial number of the refill unit 111, wherein by obtaining the unique identifier for refill 111, all of the manufacturing data is retrievable and can be used to perform certain methods or portions thereof disclosed herein. Exemplary refill units are shown and described in U.S. Pat. No. 9,172,26 titled Power Systems for Touch Free Dispensers and Refill Units Containing a power source and U.S. Pat. No. 8,646,655 titled Methods for Resetting Stalled Pumps in Electronically Controlled Dispensing Systems which are incorporated herein by reference in their entirety. Refill units 112, 113, 114 and 115 are similarly assigned a unique identifier and one or more pieces of manufacturing data are stored in their memory (not shown) in communications circuitry 120 and/or stored in the database in a master station (not shown).

Figure 2:
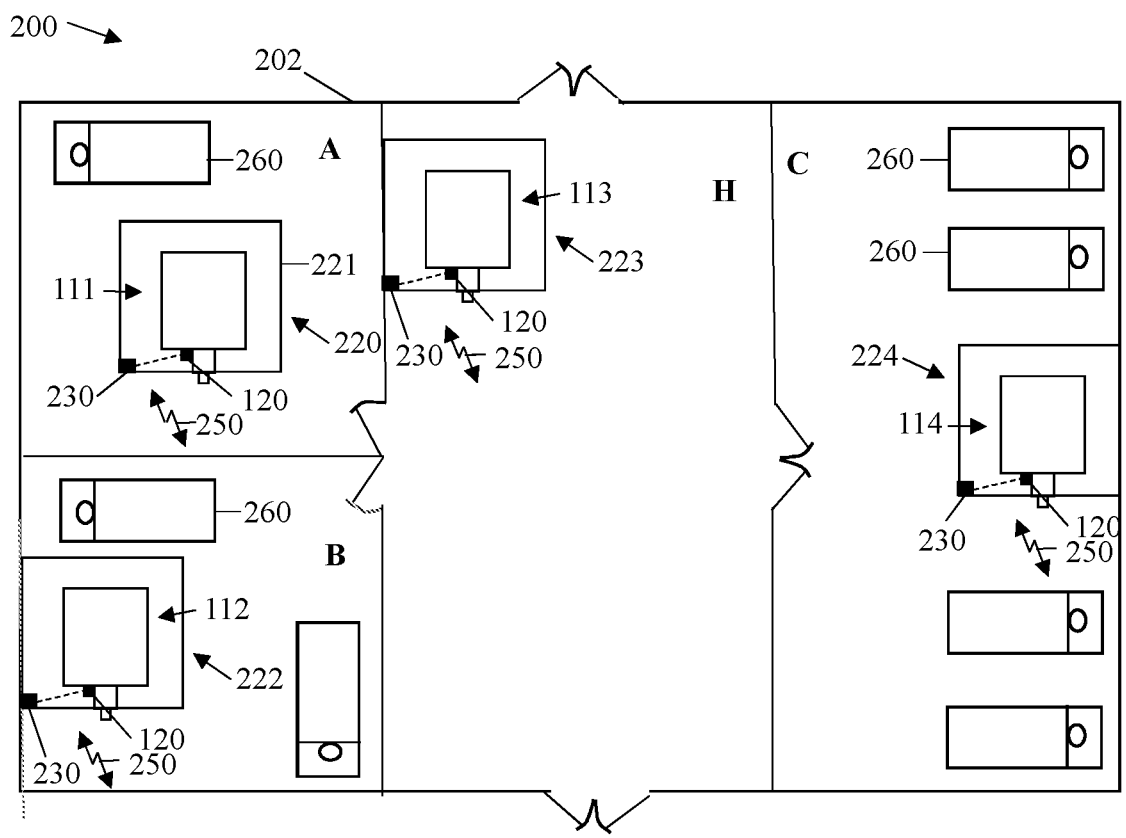
FIG. 2 is a schematic diagram of an exemplary place of use for dispensers.

FIG. 2 is a schematic diagram of an exemplary place of use, which is in this case is a hospital wing 200. Hospital wing 200 includes a private room A, a semi-private room B, an intensive care room C and a hallway H. Located in each room A, B, C and in the hallway H are dispensers 220, 222, 223, 224. Room A includes dispenser 220. The dispensers may be any type of dispenser, such as, for example, the exemplary dispensers shown and described in U.S. Pat. No. 9,172,26 titled Power Systems for Touch Free Dispensers and Refill Units Containing a power source and U.S. Pat. Application Publication No. 2012/0,245,729 titled Network Enabled Dispenser, which are incorporated herein by reference in their entirety. The discussion centers around dispenser 220, however, dispensers 222, 223, 224 all have the same or similar capabilities and will not be separately described herein. Dispenser 220 includes wireless communications circuitry 230 (which includes memory (not shown) and may include a processor (not shown)).

The wireless communication circuitry 230 may be any type of wireless communication circuitry configured as described herein, such as, for example, a Radio Frequency Identification Device ("RFID"), Bluetooth® communication circuitry, a radio frequency module ("RF transceiver"); an InfraRed transmitter/receiver, a wi-fi router, combinations thereof and the like. In some embodiments, wireless communication circuitry 220 is not used and the data is transmitted via a hardwired connection (not shown), a cable with a connector (not shown), one or more contacts (not shown).

Dispenser 220 includes a housing 221. A refill unit 211 is secured to dispenser housing 221 of dispenser 2220. When refill unit 211 is installed in dispenser 220, wireless communication circuitry 230 establishes communication with wireless communication circuitry 120 and retrieves the serial number for refill unit 111 ("RUSN") and may receive one or more pieces of manufacturing data if the manufacturing data is stored on the refill unit 111.

In some embodiments, communication circuitry 120 transmits the RUSN to a master station 300 (FIG. 3), via wireless signal 250. In addition, when dispenser 220 dispenses a dose of fluid, such as, for example, hand sanitizer, the dispense event is transmitted to master station 300 via wireless signal 250. In some embodiments, the dispenser 220 transmits the RUSN to the master station and in some embodiments, the wireless communication circuitry 120 of refill unit 111 transmits the RUSN to the master station. In some embodiments, dispenser identification data is transmitted via signal 250 to the master station 300 by one of wireless communication circuitry 230 in the dispenser 220 or wireless communication circuitry 120 on refill unit 111. In some embodiments, the dispenser 220 transmits a dispense signal to wireless communication circuitry 120. In some embodiments, information indicative of the dispense event, and/or fluid remaining in refill unit 111 is stored in memory (not shown) on the refill unit 111. As discussed above, the other dispensers 222, 223 and 224 and refill units 112, 113 and 114 operate similarly.

In some embodiments, dispensers 220, 222, 223 and 224 are networked together. In some embodiments, the dispensers 220, 222, 223 and 224 communicate with one another in leu of communicating with a master station or in conjunction with a master station. In some embodiments, the networked dispensers 220, 222, 223 and 224 may perform many of the functions described herein without the need to communicate with a master station.

Figure 3:
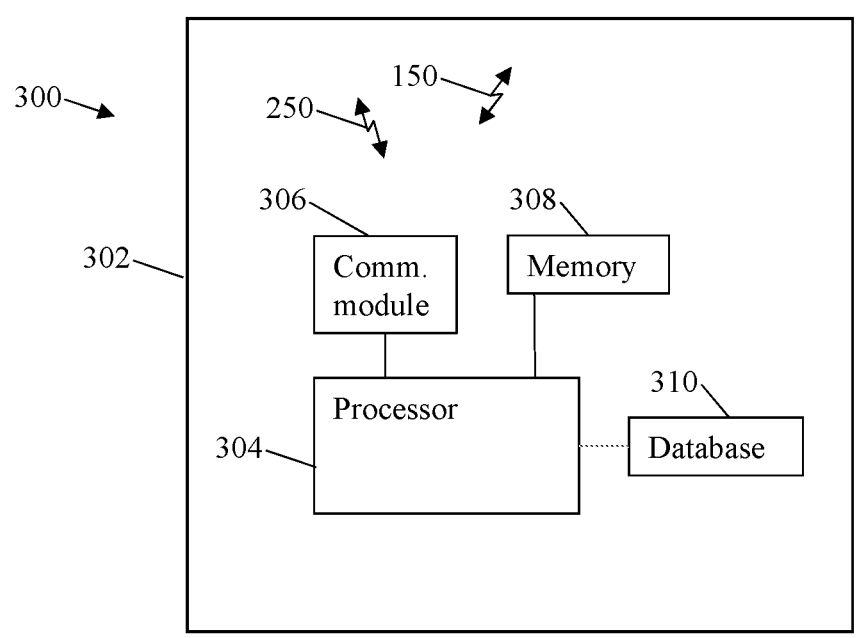
FIG. 3 is a schematic diagram of an exemplary master station.

Master station 300 shown in FIG. 3 includes housing 302, a processor 304, such as, for example, a microprocessor, wireless communication circuitry 306, memory 308 and a database 310, which may be stored in memory 308. Processor 304 is in circuit communication with wireless communication circuitry 306 and memory 308. The wireless communication circuitry 306 may be any wireless communication circuitry, such as, for example, a Radio Frequency Identification Device ("RFID"), Bluetooth® communication circuitry, a radio frequency module ("RF transceiver"); an InfraRed transmitter/receiver, a wi-fi router, combinations thereof and the like. In some embodiments, wireless communication circuitry 306 is not used and the data is transmitted via a hardwired connection (not shown), a cable with a connector (not shown), or the like. Located in memory 308 is logic for causing the processor to performing operations disclosed herein. As described above, in the case of networked dispensers, logic may be stored in the memory (not shown) of one or more of dispensers 220, 222, 223 and 224. Database 310 may contain manufacturing data related to the manufacture of the refill units, or may obtain the manufacturing data from the refill unit 111.

In some exemplary embodiments, the refill unit communication circuitry 120 or dispenser 220 sends data to master station 300 and the master station 300 determines usage rates and expected depletion dates. In some exemplary embodiments, the dispenser 220 or refill unit 111 itself calculates usage rates or depletion dates. In some exemplary embodiments, usage rates and/or depletion dates comprise a first portion associated with weekday usage and a second portion with week end usage. In some embodiments, usage rates and/or depletion rates are normalized over a selected time period, such as for example, 3 weeks to deemphasize spikes/drops in usage rates that may occur, such as, for example, during special events or vacation schedules. In some embodiments, the depletion rates are a function of the volume of fluid remaining in the refill unit. In some embodiments, the depletion rates are a function of the number of dispenses dispensed from a refill unit.

The functionality described herein may occur in the master station, in the dispenser, or on the refill itself. As described above, in some embodiments, the refill units or dispensers send signals to one another in addition to, or in lieu of, sending signals to the master station. In some embodiments, multiple dispensers may be networked and may transmit data between one another and may be configured to perform all or some of the functions and operations described herein, such as, for example, determining whether to provide instructions to a user to move two or more refill units between two or more dispensers to avoid having a refill unit expire, or avoid one or more dispensers running out of fluid rapidly while one or more associated dispensers are not using as much fluid. In some embodiments, use of the methodologies disclosed herein may allow all of the dispensers to be refilled at about the same time because the refill units are moved around to cause all of the refill units to be emptied at approximately the same time.

In an exemplary facility, such as, for example, hospital wing 200, there are a plurality of dispensers 220, 222, 223 and 224 located in various locations. Each of these locations may have different usage characteristics. For example, the usage rate in private room A may be a low usage rate, the usage rate in semi-private room B may be a medium usage rate, and the usage rates in intensive care room C and a hallway H may be high usage rates.

As described in more detail below, the systems disclosed herein can monitor or determine usage rates for each of the dispensers and calculate projected depletion dates. Based on the projected depletion dates, the system may provide one or more instructions or recommendations for swapping out a refill unit in one dispenser with another refill unit and another dispenser. For example, the system may determine that refill 114 is going to be depleted in two weeks and refill 111 will not be depleted for two months. Based on this determination, the system may recommend swapping refill unit 114 and refill unit 111. The swapping of refill units may be done for a number of reasons, such as, for example, to balance inventory, to allow replacement of refill units on a more consistent basis, to prevent a refill unit from expiring prior to depleting its contents, to prevent a refill unit from running out during a period of time that there are not staff on hand to replace the refill unit, to prevent a refill unit from running out of fluid prior to scheduled replacement, or when inventory is unavailable, and the like.

In some embodiments, the system compares the usage rate and/or the expected depletion date and the expiration dates and provides one or more instructions or recommendations for switching refill units with other refill units. For example, the system may determine that refill unit 112 is going to be depleted in two months, however, the expiration date is in one month. The system then looks at expected depletion rates and/or usage rates and expiration dates of the other refill units installed in dispensers. The system may determine refill unit 111 is going to be depleted in two months and does not expire for three months, while refill unit 113 has an expected depletion date in 6 months and the usage rate of dispenser 223 would deplete refill unit 112 within the month. Based on the expiration dates, estimated depletion dates and/or usage rate, the system may issue instructions or recommendations to swap refill unit 113 and refill unit 112. In some embodiments, the swap is recommended even though the refill unit will not be depleted prior to the expiration date because the swap will result in more product being used than it would have been otherwise and therefore less product being wasted. As disclosed below, in some embodiments, when the refill unit expiration date passes, the dispenser is prevented from dispensing additional product from the refill unit.

The expected depletion dates and usage rates may be calculated in the master station, in the dispenser, or on the refill unit. The master station, dispenser or refill unit may provide instructions for swapping out refill units or providing alerts to users. In some embodiments, the dispenser sends a signal to a user when the user is in proximity of the dispenser instructing the user to swap one or more refill units. In some embodiments, multiple dispensers may link with one another and make determination that one is going to be depleted too soon or past an expiration date and provide instructions to a user to swap refill units. Thus, the plurality of linked or networked dispensers may make up the system. For example, dispenser 220, 222, 223, 224 may communicate with one another and may obtain usage rates, expected depletion dates and provide instructions or recommendations for swapping refill units to level usage, avoid expired product, or to avoid having one or more dispensers run out of product, and/or limit the amount of product wasted due to expiration dates or due to maintenance staff replacing refill units that are only partially depleted because they may not last until the next scheduled replacement date.

Figure 4A:
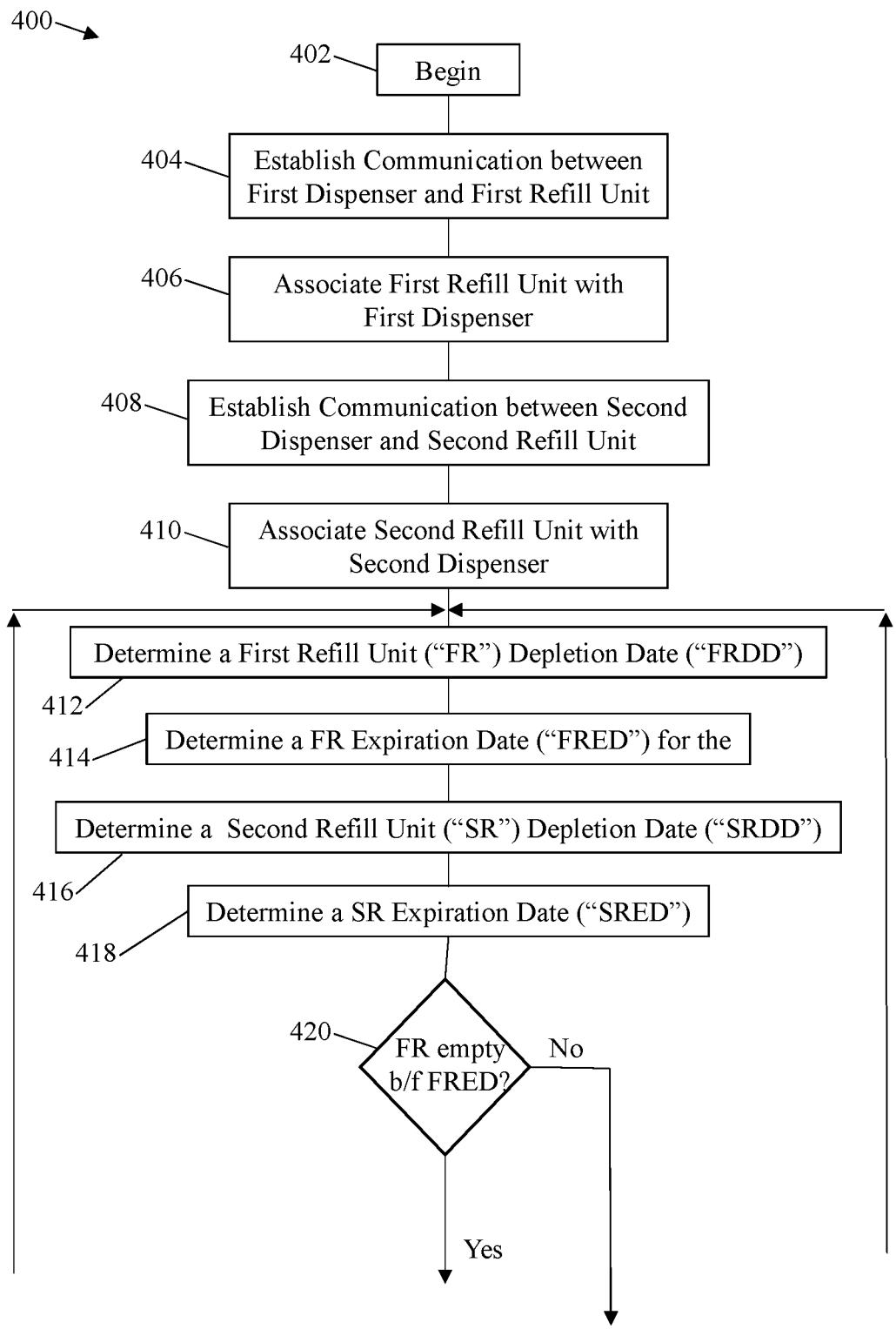
FIGS. 4A, 4B are an exemplary methodology for relocating refill units as a function of their expiration date and their expected depletion date.
Figure 4B:
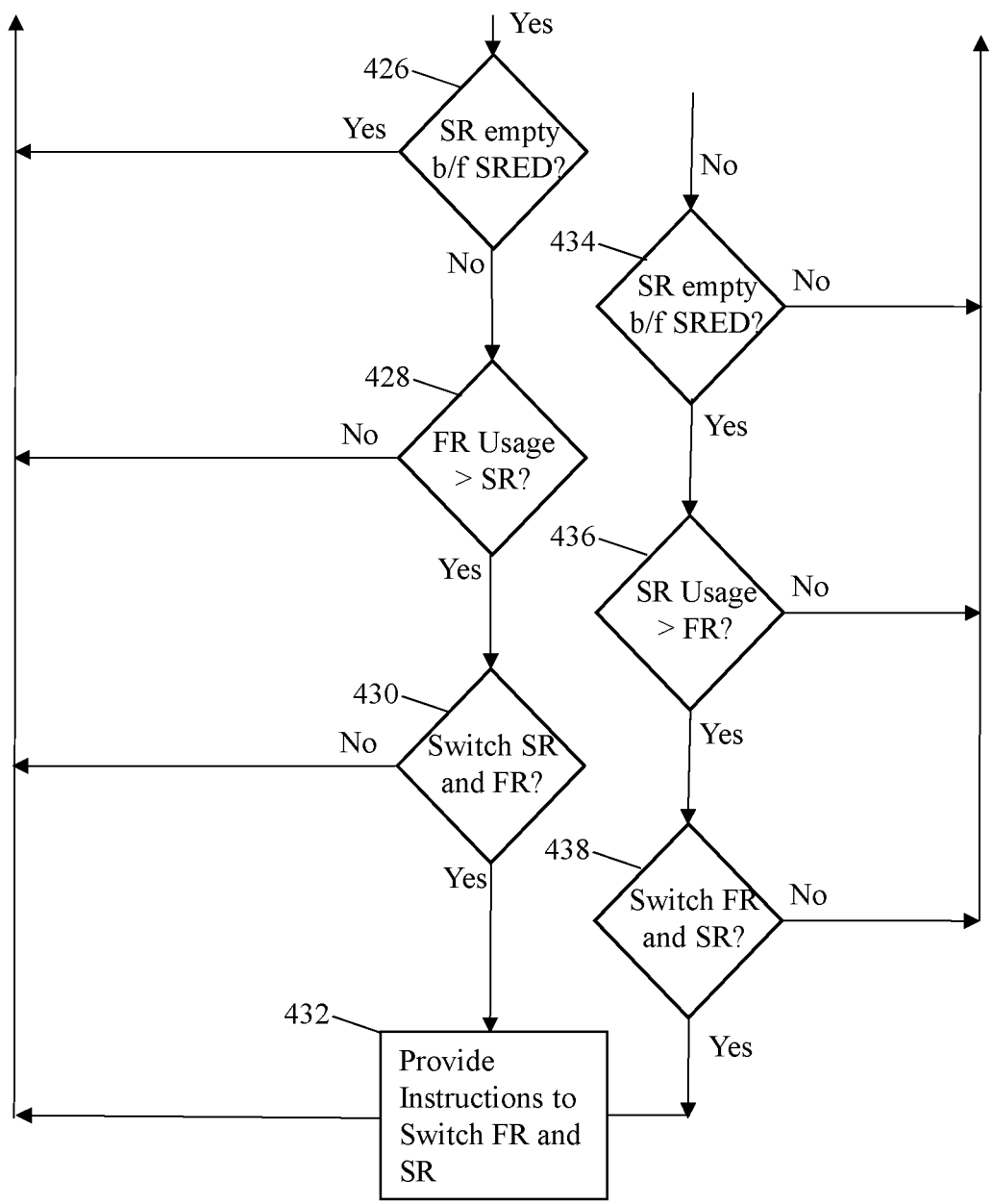

FIG. 4 is an exemplary methodology 400 for relocating refill units as a function of their expiration date and their expected depletion date. The exemplary embodiment begins at block 402. At block 404, communications between a first dispenser and a first refill unit is established. At block 406 the first refill unit is associated with the first dispenser. The association may be done locally in the dispenser or in the refill unit, or may be done remotely at a master station. At block 408, communications between a second dispenser and a second refill unit are established. At block 410 the second refill unit is associated with the second dispenser. The association may be done locally in the dispenser or in the refill unit, or may be done remotely at a master station.

The estimated depletion date for the first refill ("FRDD") is determined at block 412. The estimated depletion date may be determined as, for example, a function of the number of expected dispenses for the refill unit and the average dispenses for one or more time periods. In some embodiments, the average dispenses for weekday usage (a first time period) is calculated and the average dispenses for weekend usage (a second time period) is calculated. Based on these two time periods, the expected depletion date calculation can factor into account both weekday and weekend usage rates. In addition, in some embodiments, the usage rates are normalized over a period of time, such as, for example, three weeks, to factor out abnormal/random usage spikes or declines that may occur. Usage spikes may occur, for example, during company meetings/events, and usage declines may occur, for example, during spring break vacation time periods or other high vacation time periods. The expected dispenses for the refill unit may be determined, for example, as a function of the size of the refill unit and the volume of the dose being dispensed. The expected dispenses may be a function of the volume of fluid left in the refill. In some embodiments, the volume of fluid may be determined by a level sensor. In some embodiments, the volume of fluid may be determined by a weight sensor. In some embodiments, the volume of fluid may be determined by a formula based upon a starting volume minus the number of doses dispensed from the refill unit times the volume of each dose dispensed.

The first refill unit expiration date ("FRED") is obtained at block 414. The expiration date may be obtained directly from the refill unit or from a database that correlates the refill unit and the expiration date. The second refill depletion date ("SRDD") is determined at block 416 and the second refill expiration date ("SRED") is obtained at block 418.

As a function of the first refill expected depletion date (FRDD) a determination is made at block 420 of whether the first refill will be depleted prior to the first refill expiration date (FRED). If the first refill unit will be depleted prior to FRED, a determination is made at block 426 as to whether the second refill unit will be depleted by the second refill expiration date (SRED). If the second refill unit will be depleted prior to SRED, the methodology loops back to block 412. If the second refill unit will not be depleted prior to SRED, a determination is made at block 428 as to whether the first refill unit usage rate is greater than the second refill usage rate. If it is not, the methodology loops back to block 412. If the first refill usage rate is greater than the second refill usage rate, a determination is made at block 430 as to whether to switch the first refill unit and the second refill unit. The determination may factor in the amount of product expected to be left when the first and second refill units reach their expiration dates; the determination may take into account routine maintenance schedules; and the like. If the determination is made not to switch the refill units, the methodology loops back to block 412. If a decision is made to switch the two refill units, instructions are provided at block 432. The instructions may be sent to individuals in the vicinity of one of the dispensers, to maintenance personnel, to management, in a routine report, in an emergency report or the like. After providing the instructions, the methodology loops back to block 412.

If at block 420 it was determined that the first refill unit will not be depleted prior to FRED, a determination is made at block 434 as to whether the second refill unit will be depleted prior to SRED. If it will not, the methodology loops back to block 412. If it will, a determination is made at block 436 as to whether the second refill usage rate is greater than the first refill usage rate. If it is not, the methodology loops back to block 412. If it is, a decision is made at block 438 as to whether to switch the first refill unit with the second refill unit. Again, the decision may be made based on many factors, such as, for example, the amount of product that will be left in one of the dispensers at the expiration date. If the decision is not to swap the refills, the methodology loops back to block 412. If the decision is made to swap the refill units, instructions are provided at block 432 to swap out the two refills and the methodology loops back to block 412.

Although many of the descriptions herein discuss two dispenser/refill units for simplicity's sake, the principles and concepts may be applied to as many dispensers/refill units as needed.

Figure 5A:
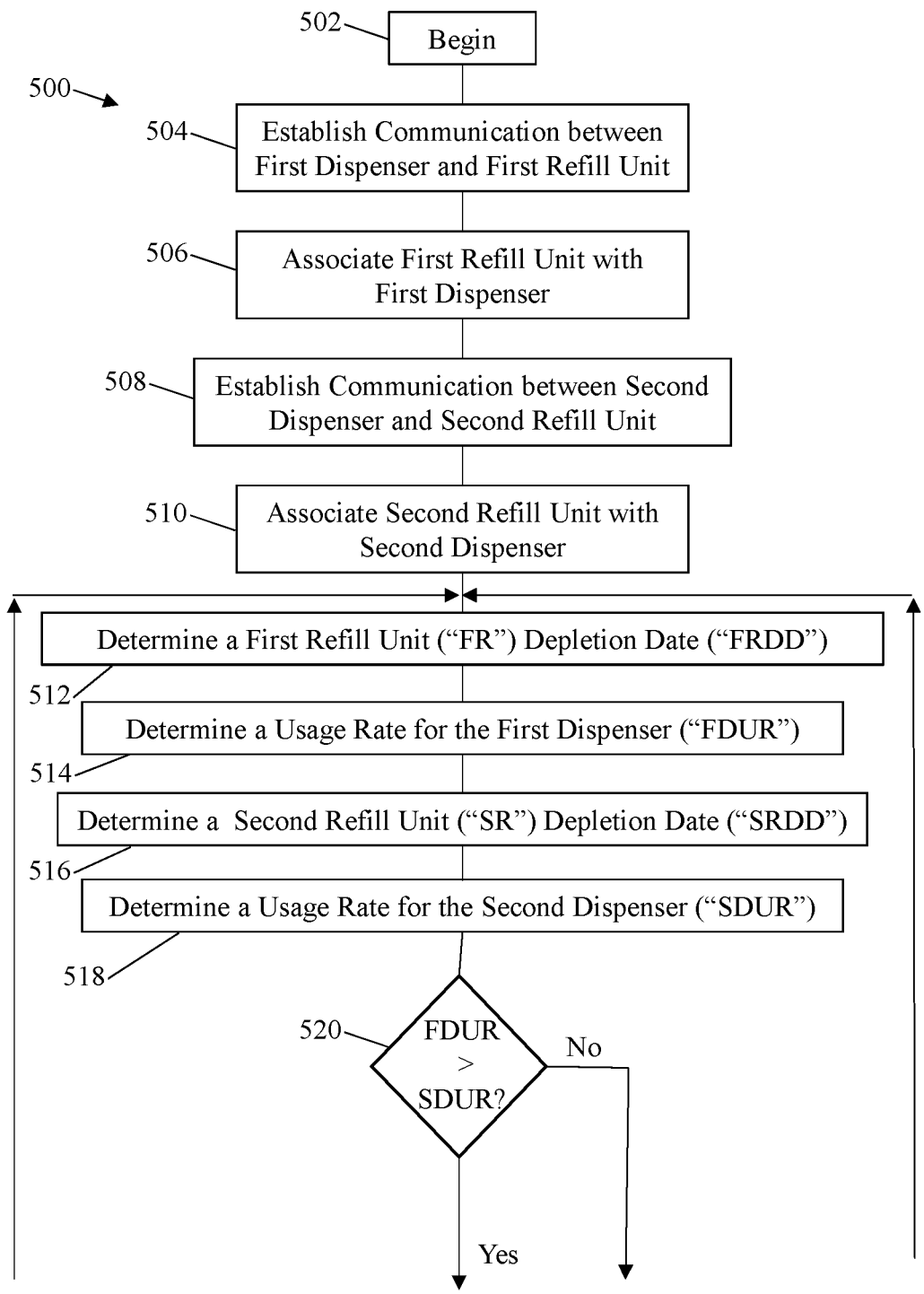
FIGS. 5A, 5B are another exemplary methodology for relocating refill units as a function of their usage rate and their expected depletion date.
Figure 5B:
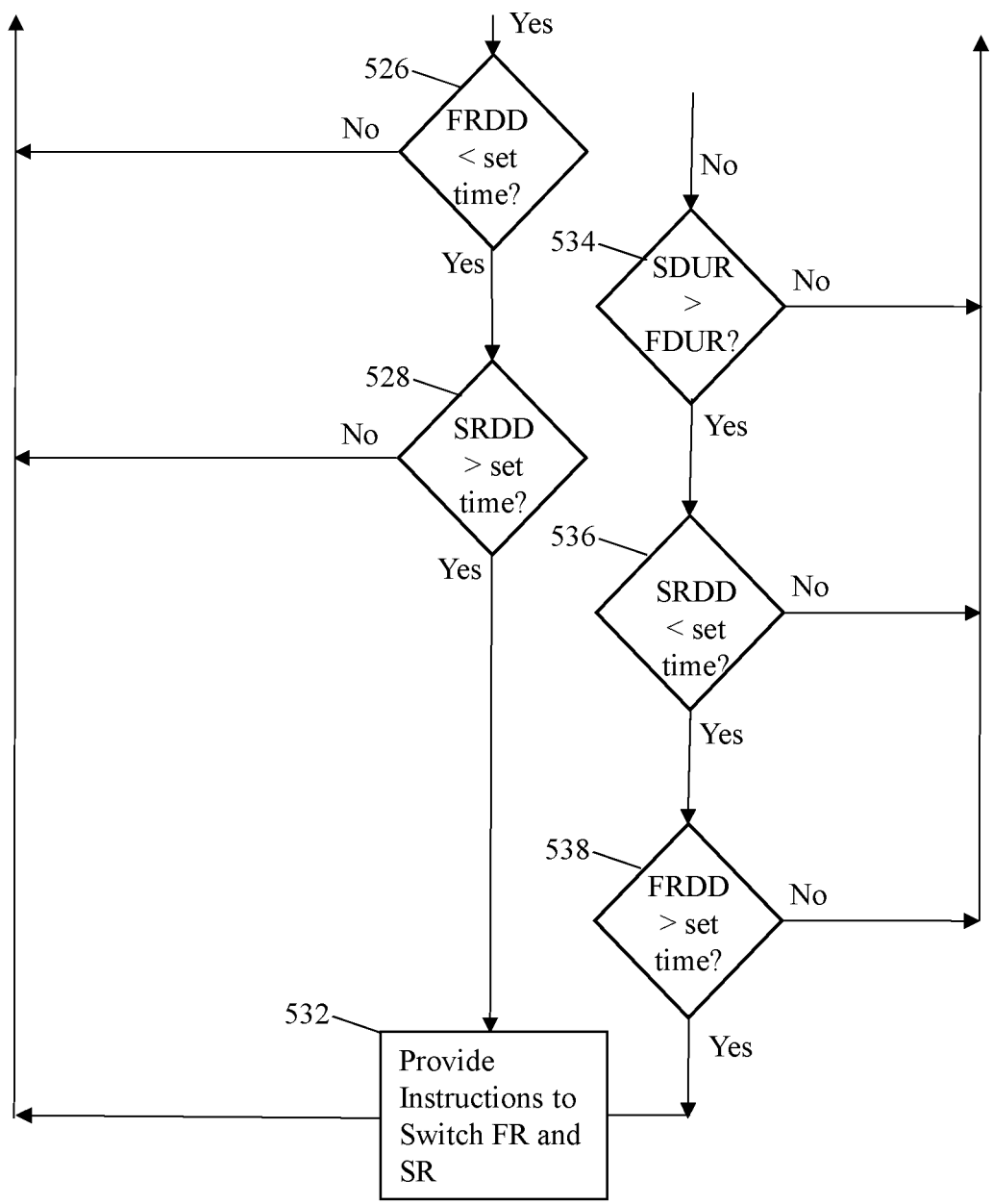

FIG. 5 is an exemplary methodology 500 for relocating refill units as a function of their usage rate and their expected depletion date. The exemplary embodiment begins at block 502. At block 504, communications between a first dispenser and a first refill unit is established. At block 506 the first refill unit is associated with the first dispenser. The association may be done locally in the dispenser or in the refill unit, or may be done remotely at a master station. At block 508, communications between a second dispenser and a second refill unit is established. At block 510 the second refill unit is associated with the second dispenser. The association may be done locally in the dispenser or in the refill unit, or may be done remotely at a master station.

The estimated depletion date for the first refill ("FRDD") is determined at block 512. The estimated depletion date may be determined as, for example, a function of the number of expected dispenses for the refill unit and the average dispenses for one or more time periods. In some embodiments, the average dispenses for weekday usage (a first time period) is calculated and the average dispenses for weekend usage (a second time period) is calculated. Based on these two time periods, the expected depletion date calculation can factor into account both weekday and weekend usage rates. In addition, in some embodiments, the usage rates are normalized over a period of time, such as, for example, three weeks, to factor out abnormal/random usage spikes or declines that may occur. Usage spikes may occur, for example, during company meetings/events. Usage declines may occur, for example, during spring break or other high vacation time periods. The expected dispenses for the refill unit may be determined, for example, as a function of the size of the refill unit, as a function of the volume of the dose being dispensed, as a function of the volume of fluid remaining in the container, as a function of the number of expected doses of fluid in the container, combinations thereof or the like.

The first dispenser usage rate ("FDUR") is determined at block 514. The usage rate may be determined as discussed above. The second refill depletion date ("SRDD") is determined at block 516 and the second dispenser usage rate ("SDUR") is determined at block 518.

At block 520 a determination is made as to whether the FDUR is greater than the SDUR. If the FDUR is greater than the SDUR then a determination is made as to whether the FRDD is less than a set time. There may be more than one set times and the set time may be a function of the set time of one or more other refill depletion dates. The set time, may be any period of time, such as, for example, 1 week. If it is not less than the set time, the methodology loops back to block 512. If it is less than the set time, a determination is made as to whether the SRDD is greater than a set time. The set time may be any time period such, as, for example, 1 week. The set time period may be multiple time periods. The set time period may be a function of one or more other refill depletion dates. If it is not greater than the set time, the methodology loops back to block 512. If it is greater than the set time, instructions are provided at block 532 to swap the first and second refill units, and the methodology loops back to block 512.

In some embodiments, the exemplary methodology may be used to maintain fresher product, i.e. to prevent product from sitting in low usage dispensers for a long period of time. In some embodiments, the exemplary methodology may be used to cause multiple dispensers to be empty, or near empty, at the same time so that the maintenance worker can replace multiple refill units at one time rather than replace each refill unit at different times. In some embodiments, the exemplary methodology may prevent waste as maintenance workers tend to replace multiple refill units at the same time, resulting in discarding residual product in refill units because they do not want to have to make a second trip in a week or two to replace that refill unit individually. In some embodiments, the exemplary methodology may be used to prevent problems in low use dispensers, such as clogged nozzles.

If at block 520 a determination is made that FDUR is not greater than SDUR a determination is made as to whether the SDUR is greater than the FDUR at block 534. If it is not, the methodology loops back to block 512. If SDUR is greater than FDUR, a determination is made at block 536 as to whether SRDD is less than one or more set time periods. If it is not, the methodology loops back to block 512. If it is, a determination is made as to whether FRDD is greater than one or more set time periods. If it is not, the methodology loops back to block 512. If it is, instructions are provided at block 532 to swap the first and second refill units, and the methodology loops back to block 512. This is merely one exemplary embodiment for determining whether to swap two or more refills. In some embodiments, the decision whether or not to swap out two or more refills is very simple and is a function of the usage rates of two or more dispensers and estimated depletion dates of two or more refills. Accordingly, as noted above, in the exemplary methodologies disclosed herein, additional blocks may be added, blocks may be removed and blocks may be performed in different orders.

Figure 6:
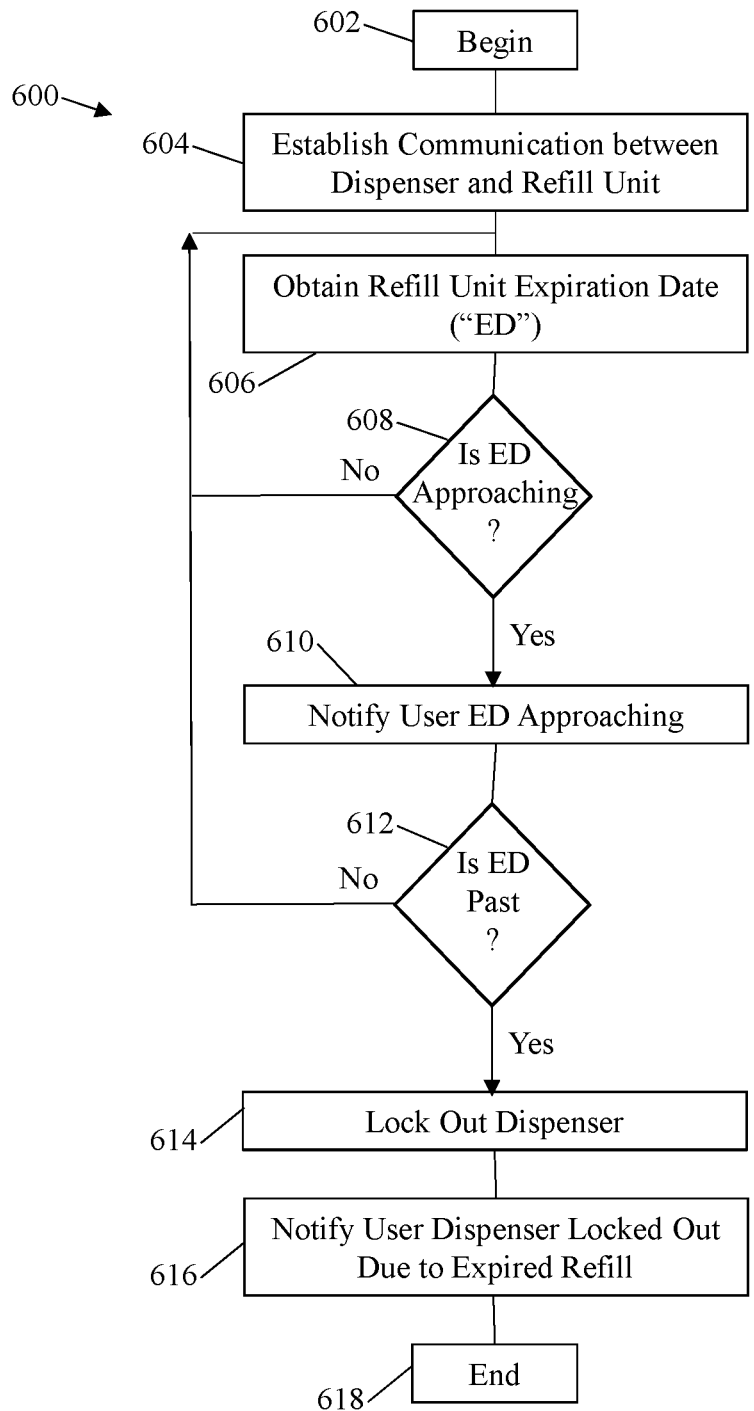
FIG. 6 is an exemplary methodology for preventing use of refill units past their expiration date.

FIG. 6 is an exemplary methodology 600 for preventing use of refill units past their expiration date. The exemplary embodiment begins at block 602. At block 604, communications between a dispenser and a refill unit are established. The refill unit expiration date is obtained at block 606. The expiration date may be obtained directly from the refill unit or from a database that corresponds to the refill unit. At block 608 a determination is made as to whether the expiration date is approaching. If it is not, the methodology loops back to block 606. In some embodiments, a determination (not shown) is made as to whether the refill unit will be depleted based on a calculated usage rate and if it will, the methodology ends. In some embodiments, a message is provided to the user at block 610 that the expiration date is approaching for the refill unit. In some embodiments, at block 610 the user is instructed to swap the refill unit with a refill unit in a dispenser that has a higher usage rate so that the refill unit will be depleted prior to the expiration date.

At block 612 a determination is made as to whether the refill unit is past its expiration date. If it is not, the methodology loops back to block 606. If it is, the dispenser is locked out at block 614 and a notification is issued at block 616 that the dispenser is locked out due to the expiration of the refill unit and the methodology ends at block 618.

Figure 7:
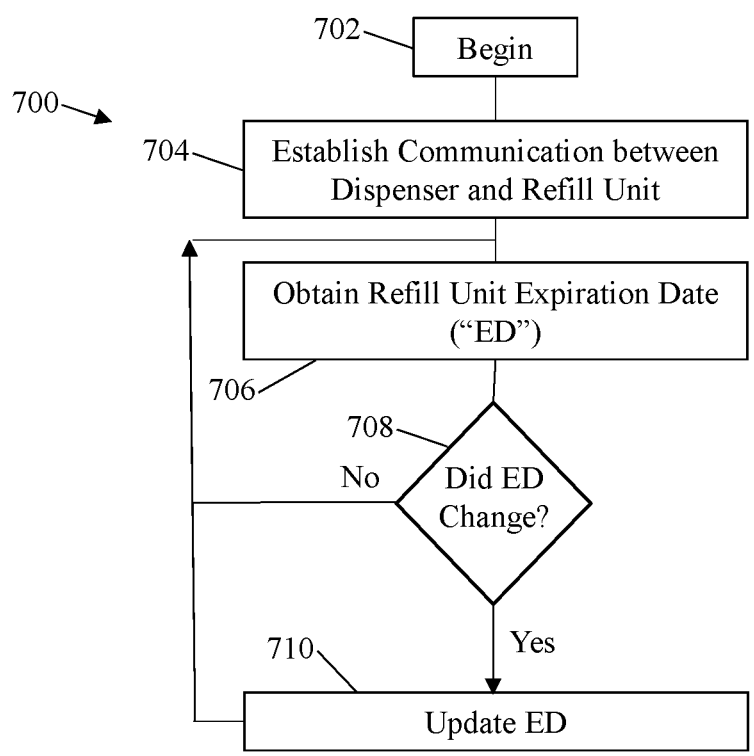
FIG. 7 is an exemplary methodology for resetting an expiration date for a refill unit.

FIG. 7 is an exemplary methodology 700 for resetting an expiration date for a refill unit. The exemplary embodiment begins at block 702. At block 704, communications between a dispenser and a refill unit are established. The refill unit expiration date is obtained at block 706. The expiration date may be obtained directly from the refill unit or from a database that corresponds to the refill unit. At block 708 a determination is made as to whether the expiration date is correct or should be changed. The determination may be made by communications with a master station that has been updated with new expiration dates. In some embodiments, the master station determines that selected refill units expiration dates have changed and the master station has associated those refill units with selected dispensers and the master station sends a communication to the selected dispensers to update the expiration date of the refill unit. Expiration dates may periodically change based on one or more factors, such as, for example, a change in the FDA's policies, a change due to changes in expiration dates of one or more of the ingredients and the like. If the expiration date has not changed, the methodology loops back to block 706. If the expiration date should be changed, the expiration date is recalculated and updated at block 710 and the methodology ends or loops back to block 706.

Figure 8:
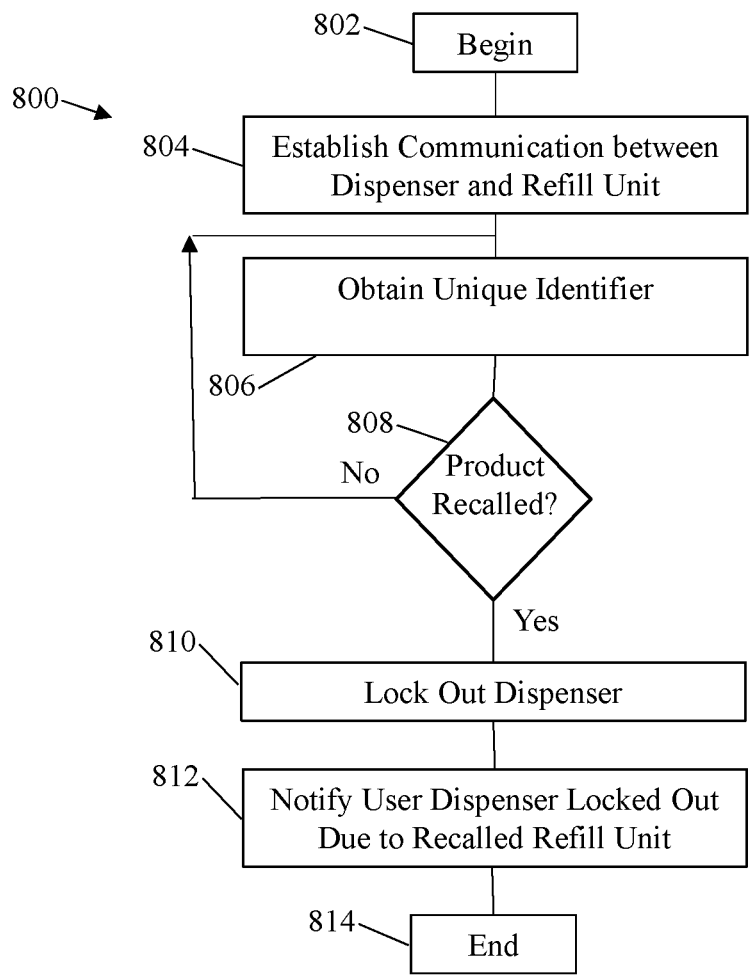
FIG. 8 is an exemplary methodology for enforcing recalls for a refill unit.

FIG. 8 is an exemplary methodology 800 for enforcing recalls for a refill unit. The exemplary embodiment begins at block 802. At block 804, communications between a dispenser and a refill unit are established. The refill unit unique identifier is obtained at block 806. At block 808 a determination is made as to whether a recall has been issued for the refill unit. The determination may be made at, for example the master station. In some embodiments, the master station may have already associated the refill unit with a dispenser and proactively communicated with the dispenser that the refill unit has been recalled. In some embodiments, the dispenser transmits the refill unit unique identifier to the master station and the master station compares the unique identifier to a recall list. If the refill unit has not been recalled, the methodology loops back to block 806. If a recall has been issued for the refill unit, the dispenser is locked out at block 710, a user is notified that the dispenser is locked out due to a recalled refill unit at block 812 and the methodology ends at block 814.

Figure 9:
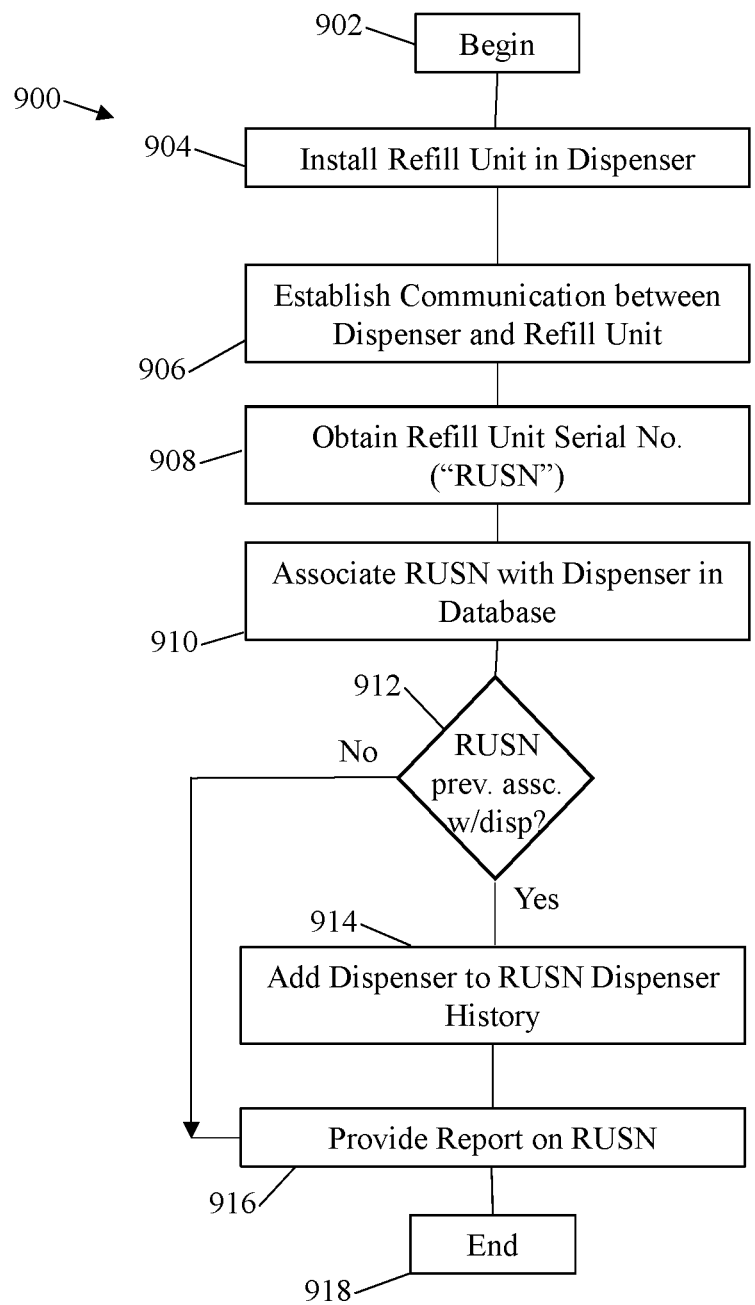
FIG. 9 is an exemplary methodology for tracking a refill unit.

FIG. 9 is an exemplary methodology 900 for tracking a refill unit. The exemplary embodiment begins at block 902. At block 904, communications between a dispenser and a refill unit are established. The refill unit identifier or serial number ("RUSN") is obtained at block 908. The RUSN is associated with the dispenser in a database. At block 912, a determination is made as to whether the refill unit was previously associated with a dispenser. If it has not been previously associated with a dispenser, a report is provided on the history of the refill unit at block 916. If the refill unit has previously been associated with a prior dispenser, the database is updated to include the association of the refill unit with an additional dispenser at block 914 and a report on the refill is provided at block 916. In some embodiments, the volume of fluid dispensed, or doses of fluid dispensed from the refill unit by each dispenser is also included in the dispenser history. For example, a refill unit's dispenser history may include a first dispenser with 100 doses dispensed from the refill unit by that dispenser, a second dispenser with 500 doses being dispensed from the refill unit by that dispenser, and a third dispenser with 25 doses dispensed from the refill unit by that dispenser. The methodology ends at block 918.

The exemplary methodologies are not limited to the order presented in the exemplary embodiments. In addition, the methodologies may contain additional steps or may have fewer steps. For example, the methodology 600, may eliminate blocks 608 and 610 or may include additional steps as indicated in the description.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A system for managing soap, sanitizer and lotion refills comprising:
    a first container and pump;
        the first container containing a first fluid;
        a first processor;
        a first memory;
        first wireless communications circuitry;
    a master station;
        the master station having
            a master station processor;
            a master station memory;
            master station communications circuitry;
    logic stored in one of the first memory and the master station memory for determining one or more usage rates of the first fluid in the first container;
    logic stored in one of the first memory and the master station memory for determining an expected depletion date for the first fluid as a function of one or more usage rates for the first fluid; and
    logic stored in one of the first memory or the master station memory for providing instructions to move the first container and pump prior to the expected depletion date.

2. The system of claim 1 further comprising:
    a second container and pump;
    the second container and pump having a second fluid;
        a second processor;
        a second memory;
        logic stored in the memory of one of the second memory and the master station memory for determining one or more usage rates of second fluid;
        logic stored in one of the first memory, the second memory, and the master station memory for providing instructions move the second container prior to the expected depletion date.

3. The system of claim 2 further comprising logic stored in one of the first memory, the second memory, and the master station memory for providing instructions replace the second container with the first container.

4. The system of claim 2 further comprising logic stored in one of the first memory, the second memory, and the master station memory for providing instructions to replace the first container with the second container.

5. The system of claim 2 further comprising logic stored in one of the first memory, the second memory, and the master station memory for obtaining an expiration date for the first fluid in the first container and an expiration date for the second fluid in the second container and wherein providing instructions to move the first container to the location of the second container and the second container to the first container is a function of at least one of the expiration date for the first fluid and an expiration date for the second fluid.

6. The system of claim 2 further comprising logic stored in one of the first memory, the second memory, and the master station memory wherein providing instructions to move the first container to the location of the second container and the second container to the location of the first container is a function of the usage rates of the first fluid and second fluid.

7. The system of claim 2 further comprising logic stored in one of the first memory, the second memory, and the master station memory wherein providing instructions to move the first container to the location of the second container and to move the second container to the location of the first container is a function of the estimated depletion dates of the first fluid and the second fluid.

8. The system of claim 1 further comprising logic stored in the first memory for determining an expiration date of the first fluid and logic for preventing the first fluid from being dispensed if the current date is later than the expiration date.

9. The system of claim 1 further comprising logic stored in one of the first memory and the master station memory for determining if the fluid in the first container is subject to a recall and for preventing the first fluid from being dispensed if the first refill unit is subject to a recall.

10. The system of claim 2 further comprising second wireless communications circuity and the first wireless communications circuitry and the second wireless communications circuitry are configured to communicate with one another.

11. A method for managing containers of soap, sanitizer or lotion comprising:
    providing a first container of soap, sanitizer or lotion;
        providing a first processor, a first memory, and first wireless communications circuitry;
    providing a second container of soap, sanitizer or lotion;
        providing a second processor, a second memory and second wireless communications circuitry;
    providing a master station;
        the master station having
            a master station processor;
            a master station memory;
            master station wireless communications circuitry;
    providing logic stored in one or more of the first memory, the second memory and the master station memory for determining one or more usage rates of the soap, sanitizer or lotion in the first container;
    providing logic stored in one or more of the first memory, the second memory and the master station memory for determining one or more usage rates of the soap, sanitizer, or lotion in the second container;
    providing logic stored in one or more of the first memory, the dispenser memory, and the master station memory for determining an expected depletion date for the soap, sanitizer or lotion in the first container as a function of one or more usage rates for the soap, sanitizer or lotion in the first container;

providing logic stored in one of the first memory, the second memory, and the master station memory determining an expected depletion date for the soap, sanitizer or lotion in the second container as a function of one or more usage rates for the soap, sanitizer or lotion in the second container; and providing logic stored in one or more of the first memory, the second memory, and the master station memory for providing instructions to move the first container prior to the expected depletion date of the soap, sanitizer or lotion in the first container and to move the second container prior to the expected depletion date of the soap, sanitizer or lotion in the second container.

12. The method of claim 11 further comprising providing logic stored in one or more of the first memory, the second memory, and the master station memory for providing instructions to move the first container to the original location of the second container.

13. The method of claim 11 further comprising providing logic stored in one or more of the first memory, the dispenser memory, and the master station memory for providing instructions to move the second container to the original location of the first container.

14. The method of claim 11 further comprising providing logic stored in one or more of the first memory, the second memory, and the master station memory for providing instructions to move the first container from its current location if the soap, sanitizer or lotion in the first container will expire prior to the expected depletion date.

15. The method of claim 11 wherein the usage rate is a function of a first usage rate over a first period of time and a second usage rate over a second period of time.

16. A method of proactively managing soap, sanitizer or lotion products in a dispensing system comprising:

establishing a communications link between a dispenser and a refill unit containing soap, sanitizer, or lotion;

obtaining data indicative of an expiration date for the soap, sanitizer or the lotion;

determining whether the expiration date is approaching;

if the expiration date is approaching, provide a notification that the expiration date is approaching;

determining whether the current date is after the expiration date; and preventing the dispenser from dispensing the soap, sanitizer of lotion of the current date is after the expiration date.

17. The method of claim 16 further comprising the step of determining whether the soap sanitizer or lotion will be depleted prior to the expiration date as a function of to prior usage rate of the soap, sanitizer or lotion.

18. The method of claim 16 further comprising providing instructions to move the refill unit to a dispenser having a higher usage rate if the refill unit is approaching its expiration date.

19. The method of claim 16 further comprising determining whether the expiration date of the refill unit has changed.

20. The method of claim 19 further comprising updating the expiration date of the refill unit.

* * * * *